Dec. 6, 1932.   J. G. BUTTS   1,889,820
TRANSPLANTING DEVICE
Filed Jan. 28, 1931   4 Sheets-Sheet 1
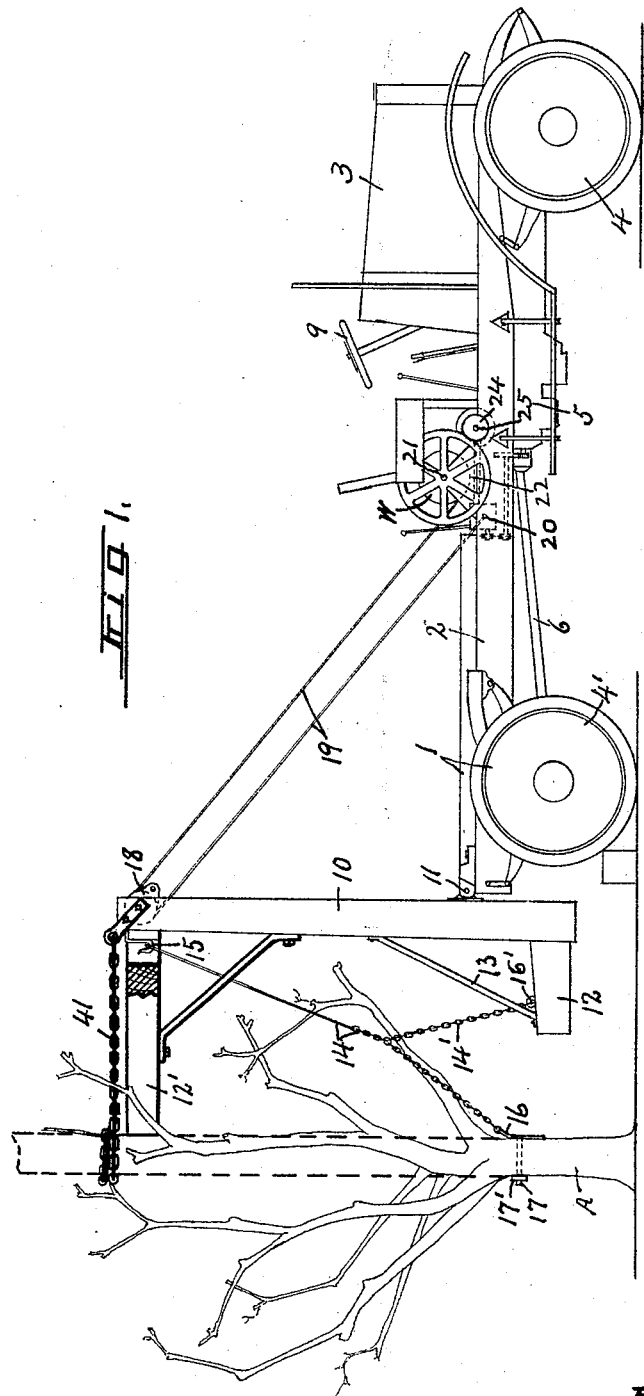

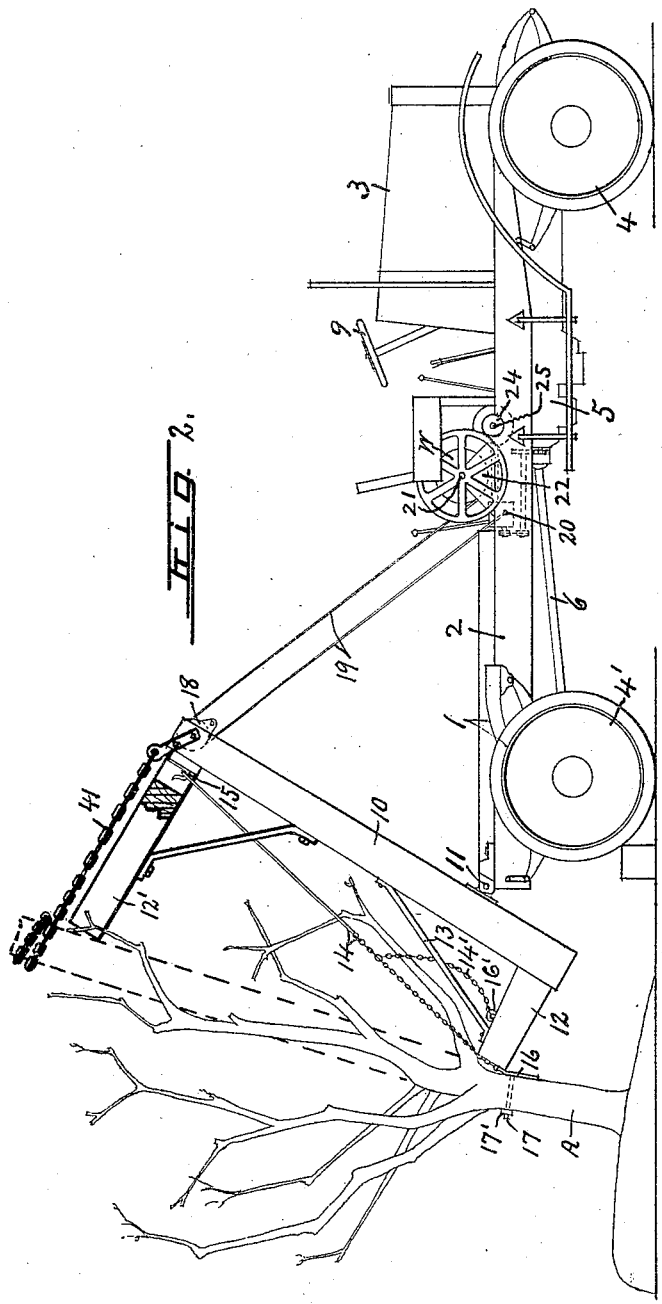

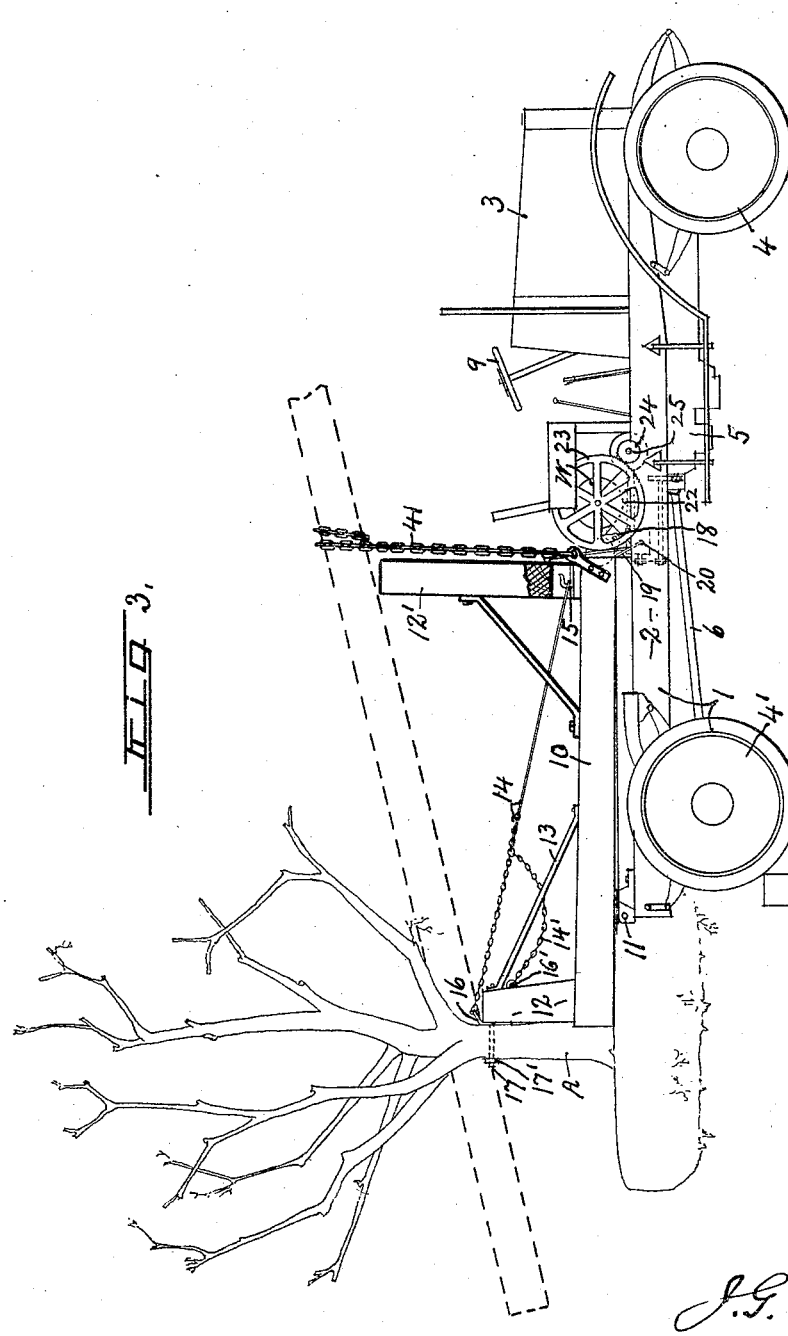

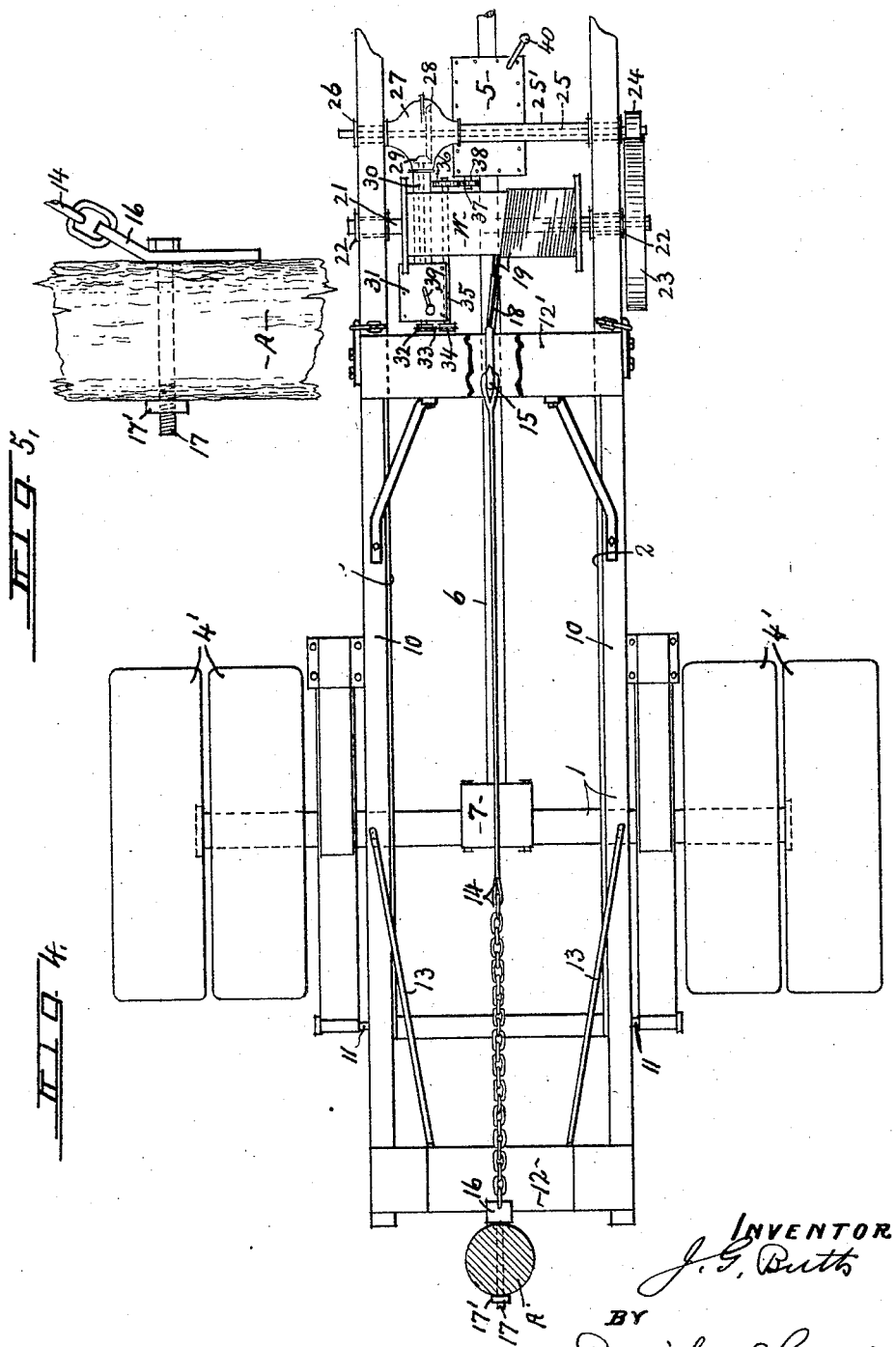

Patented Dec. 6, 1932

1,889,820

UNITED STATES PATENT OFFICE

JEAN G. BUTTS, OF CATO, NEW YORK

TRANSPLANTING DEVICE

Application filed January 28, 1931. Serial No. 511,784.

This invention relates to a method of and apparatus for transplanting trees, poles and analogous objects, the bases of which have been more or less imbedded in the ground and involves the use of a motor truck having simple and efficient means for lifting the tree or other object out of the ground, conveying it to the place of replanting and depositing the same into a previously prepared excavation.

The main object is to provide the truck with a relatively tiltable supplemental frame or lever adapted to be operated by the motor and provided with means for attachment to the object so that when operated in one direction the tree or other object will be lifted from the ground and supported upon the supplemental frame in such manner that it may be conveniently transported to the place of replanting.

In other words I have sought to provide an apparatus of this character whereby trees and analogous objects may be more conveniently, economically and expeditiously transplanted than has heretofore been practiced.

Another object is to reduce the liability of injury to the tree during the transplanting operation and to afford greater assurance of revival of the tree when transplanted.

One of the specific objects is to control the operation of the supplemental frame or lever through the medium of a motor operated winch or equivalent hoisting device and cable connections between the winch and lever, and to enable the operation of the winch to be controlled by the driver of the truck from one and the same driving position.

Other objects and uses relating to specific parts of the transplanter will be brought out in the following description.

In the drawings:—

Figures 1, 2 and 3 are side elevations of a transplanting apparatus embodying the various features of my invention and showing the successive positions to which the supplemental frame is adjusted to effect the lifting and transporting of the tree or other object.

Figure 4 is an enlarged top plan of the rear portion of the apparatus at the rear of the engine, the supplemental frame being shown in its tree-carrying position indicated in Figure 3, the object being shown in section.

Figure 5 is a side elevation of a portion of a trunk of a tree or pole showing the means of attaching the lifting cable thereto.

In order that the invention may be clearly understood I have shown somewhat diagrammatically a motor truck —1— having the usual chassis frame —2— carrying at its forward end an internal combustion engine or equivalent motor which is usually enclosed in a suitable hood —3— in a manner well known to those skilled in the art of making motor trucks, the frame being mounted upon front and rear wheels —4— and —4'— so that the truck may be conveniently transported from place to place under its own power through the medium of a variable speed transmission —5—, drive shaft —6— and differential —7—, the transmission gearing being operably connected in the usual manner to the crank shaft —8— of the engine, it being understood that the front wheels —4— will be suitably mounted for steering purposes and controlled by a steering wheel as —9— in any well known manner.

A supplemental frame or lever —10— is pivotally fulcrumed intermediate its ends at —11— to the rear end of the chassis frame —2— to swing forwardly and rearwardly or vertically from a substantially vertical position shown in Figure 1 to a substantially horizontal position shown in Figure 3, the fulcrum pivot —11— being relatively nearer to the lower rear end than to the upper front end of the supplemental frame so that the longer arm of the lever frame may normally rest upon the upper surface of the chassis frame as shown in Figure 3 when transporting the tree or other object from one place to another.

The shorter arm of the lever —10— is provided with a rearwardly and upwardly projecting saddle —12— rigid thereon and reinforced by one or more braces —13—, the length of the shorter arm being somewhat less than the distance between the rear end of the chassis frame and ground upon which the truck is supported, to allow the lever to rock freely from one extreme position to the other.

The object of the saddle —12— is to engage the trunk of the tree or other object when the lever is rocked from its normal position shown in Figure 1, to the position shown in Figure 2, preparatory to lifting the tree after the ground has been trenched or dug away around the roots.

The lever —10— constitutes the primary force for lifting the released tree from the ground through the medium of a cable —14— having one end attached to a suitable anchor —15— on the upper front end of the lever —10— and its lower end attached to an anchor plate —16— which is secured to the trunk of the tree by means of a bolt —17— passed through an opening which has been previously bored therethrough, the anchor plate —16— being rigidly held against the face of the trunk of the tree adjacent the rear end of the truck while the opposite side of the tree is engaged by a nut —17'— on the bolt —17—.

The connection —14— between the anchor members —15— and —16— is provided with a branch chain or cable —14'— connecting the intermediate portion of the cable —14— with a suitable anchor —16'— on the upper front face of the saddle —12—. The object of this branch cable —14'— is to slightly flex the intermediate portion of the cable —14— toward the lever —10— and thereby to prevent diagonal pull on the tree during the initial operation of lifting the same from the ground by the forward tilting movement of the upper end of the lever in a manner presently described, and to assist in drawing the tree —A— and saddle —12— into engagement with each other immediately following the initial upward movement of the tree.

*Lever operating means*

A sheave —18— is journaled or otherwise rotatably mounted upon the upper front end of the lever —10— for receiving the intermediate portion of a cable —19— having one end attached at —20— to the chassis frame —1— and its other end attached to the periphery of a rotary drum or winch —W— which is mounted upon a cross shaft —21—, the latter being journaled in suitable bearings —22— on the opposite sides of the frame —1—.

Suitable means is provided for transmitting rotary motion from the variable speed transmission —5— to the drum —20— for winding and unwinding the cable —19— thereon and therefrom.

For this purpose one end of the drum shaft —21— is provided with a gear —23— meshing with a pinion —24— on an additional cross shaft —25—, shown by dotted lines in Figure 4, as enclosed in a suitable housing —25'— and journaled in suitable bearings —26— in opposite sides of the frame —1— parallel with and preferably in front of the drum-shaft —21— as shown in Figure 4.

The housing —25'— for the cross shaft —25— is provided with an enlargement —27— containing a beveled gear —28— and a beveled pinion —29— which mesh with each other, the gear —28— being secured to the cross shaft —25— while the beveled pinion —29— is secured to a relatively short lengthwise shaft —30— having its forward end journaled in the enlargement —27— of the housing —25'— and its rear end journaled in a secondary transmission case —31— containing variable speed gearing of any suitable construction similar to that commonly employed in the usual variable speed power transmitting mechanism, except that it is used for controlling the operation of the winch or drum —20—.

*Secondary transmission drive*

The shaft —30— extends rearwardly through and beyond the transmission case —31— and is provided with a sprocket wheel —32— connected by a chain —33— to another sprocket wheel —34— on a countershaft —35— which extends lengthwise of the machine and is journaled in suitable bearings on the frame —1—.

The front end of the counter-shaft —35— is provided with a gear —36— meshing with a somewhat smaller gear —37— on a lengthwise shaft —38— which is journaled in the transmission gear case —5— and is driven by the gearing in said case in any suitable manner, not necessary to further illustrate or describe.

It is now evident that the variable speed transmission —5— driven by the engine shaft —8— serves as a means for transmitting power to the counter shaft —35— through the gears —37— and —36— and that this power is transmitted from the counter shaft —35— to the variable speed transmission gearing in the case —31— through the medium of the sprocket wheels —34— and —32— and chain belt —33—.

This power is further transmitted from the transmission —31— to the cross shaft —25— through the medium of the beveled gears —29— and —28—, so that when the transmission gearing in the case —31— is set in motion through its controlling member —39—, rotary motion will be transmitted from the cross shaft —25— to the winch or drum —20— through the medium of the pinion —24— and gear —23—, the gearing in the main transmission case —5— being controlled by the usual hand lever —40—, Figure 4.

The mechanism thus far described is adapted to be used more particularly for transplanting fruit trees, the trunks of which are comparatively short, in which case the trees are lifted almost vertically clear of the ground by the forward rocking movement of the lever —10— from the initial vertical position shown in Figure 1 through the intermediate position shown in Figure 2 to the final horizontal carrying position shown in Figure 3, this lifting movement being effected through the medium of the cables —14— and —14'— and end saddle —12— so that when the lever assumes the horizontal position shown in Figure 3 the tree will still remain in a substantially vertical position against the rear end of the lever and rear face of the saddle —12— with the forwardly offset portion of the anchor plate —16— resting on the top of the saddle —12—, the tree being held in this position by the then tensioned cable —14—, Figure 3, ready for transportation to the place of re-setting.

It is, of course, necessary to excavate a portion of the ground where the tree is to be re-set to receive the roots and dirt which may adhere to the roots and when the tree is brought to the place of re-setting the transmission gearing in the housing —31— will be adjusted by the adjustment of the hand lever —39— to a reverse position, thereby reversing the winch —20— and causing the cable —19— to unwind therefrom under which conditions the lever —10— will be rocked upwardly and rearwardly by the weight of the tree carried by the rear end thereof until the roots of the tree are disposed in the excavation previously prepared.

As soon as the tree is set in the soil the cable —14— will be slackened, thus permitting the anchor plate —16— and its attaching bolt —17— to be removed from the tree ready to use for transplanting other trees, in a manner described.

It is sometimes desirable, however, to transplant trees or poles with relatively long trunks and for this purpose the upper front end of the lever —10— is provided with an upwardly and rearwardly projecting saddle —12'— somewhat similar to the saddle —12—, except that it is extended a greater distance from the lever —10— in the same direction as the saddle —12— to form a rest for the trunk of the tree or pole when the lever —10— is brought to a horizontal position, as shown in Figure 3.

That is, suitable means is provided for tilting the tree or pole upon both of the saddles as it is lifted from the ground and for this latter purpose an additional cable —41— is connected at both ends to anchor members —42— on the upper front end of the lever —10— and has its intermediate portion wound one or more turns at —43— around the upper portion of the tree or pole so that when the lever —10— is rocked forwardly and downwardly from the positions shown in Figure 1 or Figure 2, the pole will be drawn across and upon both of the saddles —12— and —12'— to a horiontal position as shown by dotted lines in Figure 3, it being understood that the anchor member —42— is rigidly secured to the upper front end of the lever —10— and that the saddle —12'— will also be rigidly braced to the lever, as indicated in the drawings.

It is, of course, understood that the transmission units —5— and —31— are of the forward and reverse drive type such as are commonly used in motor vehicles having internal combustion engine motors, the unit —5— being used for driving the vehicle in reverse directions while the unit —31— is used for driving the winch —W— in reverse directions, both units being controlled by the usual gear shifting levers as —40— or —39—.

What I claim is:—

1. The herein described method of transplanting trees consisting in boring an approximately diametrical hole through the trunk of the tree, securing a bolt in said hole, and lifting the tree from the ground by means attached to the bolt.

2. In a tree transplanting apparatus, the combination with a vehicle, of a bolt adapted to be secured in a previously prepared hole in the trunk of the tree, and means mounted on the vehicle and operatively connected to the bolt for lifting the tree from the ground onto the vehicle.

3. In a tree-transplanting device, a vehicle frame, a lever hinged intermediate its ends to the frame to swing vertically about a horizontal axis and having its opposite ends provided with saddles projecting in the same direction unequal distances therefrom for engaging the trunk of the tree, the shorter saddle being considerably nearer to the hinge than the longer saddle for engaging said trunk at a point nearer to the roots of the tree than the longer saddle, means for holding the tree against said saddles, and means for rocking the lever with the tree thereon about said axis.

In witness whereof I have hereunto set my hand this 27th day of October, 1930.

JEAN G. BUTTS.